US006279887B1

(12) United States Patent
Glasenapp et al.

(10) Patent No.: US 6,279,887 B1
(45) Date of Patent: Aug. 28, 2001

(54) ARTICULATED LEVER TENSIONING DEVICE

(75) Inventors: Uwe Glasenapp, Düren; Thomas Lichtenberger, Hohenstadt, both of (DE)

(73) Assignee: Festo AG & Co., Esslingen (DE)

( * ) Notice: Subject to any disclaimer, the term of this patent is extended or adjusted under 35 U.S.C. 154(b) by 0 days.

(21) Appl. No.: 09/646,469

(22) PCT Filed: Nov. 24, 1999

(86) PCT No.: PCT/EP99/09082

§ 371 Date: Sep. 19, 2000

§ 102(e) Date: Sep. 19, 2000

(87) PCT Pub. No.: WO00/44531

PCT Pub. Date: Aug. 3, 2000

(30) Foreign Application Priority Data

Jan. 27, 1999 (DE) ........................................ 299 01 363

(51) Int. Cl.$^{7}$ ........................................ B23Q 3/08

(52) U.S. Cl. .............................. 269/32; 269/228; 269/91; 269/239

(58) Field of Search .............................. 269/32, 27, 24, 269/228, 91, 94, 239

(56) References Cited

U.S. PATENT DOCUMENTS

| | | | | |
|---|---|---|---|---|
| 4,637,597 | * | 1/1987 | McPherson et al. | 269/32 |
| 4,905,973 | | 3/1990 | Blatt . | |
| 5,575,462 | | 11/1996 | Blatt . | |
| 5,996,984 | * | 12/1999 | Takahashi | 269/32 |

FOREIGN PATENT DOCUMENTS

| | | |
|---|---|---|
| 297 13 944 U1 | 11/1997 | (DE) . |
| 296 14 630 U1 | 2/1998 | (DE) . |
| 0849047A1 | 6/1998 | (EP) . |
| 0894573A2 | 2/1999 | (EP) . |

* cited by examiner

*Primary Examiner*—Derris H. Banks
*Assistant Examiner*—Lee Wilson
(74) *Attorney, Agent, or Firm*—Hoffmann & Baron, LLP

(57) ABSTRACT

A toggle lever clamping device has a bearing head (15) arranged on an actuating means (2), on which head a pivot unit (16), which comprises a clamping arm (22), may be moved between a release position and a clamping position. An abutment face (48) is provided on the bearing head (15) for presetting the clamping position of the clamping arm (22), such abutment being in the path of pivoting of the pivot unit (16) and serving for presetting the clamping position by cooperating with the pivot unit (16).

15 Claims, 2 Drawing Sheets

ARTICULATED LEVER TENSIONING DEVICE

BACKGROUND OF THE INVENTION

The invention relates to a toggle lever clamping device comprising a bearing head terminally arranged on an actuating means and on which a pivot unit, which has a clamping arm, is pivotally mounted for pivotal movement about a pivot axis between a release position and a clamping position, an actuating rod, plunging into the bearing head, of the actuating means, furthermore an intermediate member articulated on the one hand at a first bearing point with the actuating rod and on the other hand at a distance from the pivot axis at a second bearing point with the pivot unit, and an abutment face provided on the bearing head and serving for presetting the clamping position of the clamping arm.

A toggle lever clamping device of this type is disclosed in the European patent publication 0 575 888 B1. It possesses a toggle lever arrangement constituted by the pivot unit and the intermediate member, and operated by the actuating rod, pivoted on the intermediate member, of the actuating means. On outward movement of the actuating rod the clamping arm of the pivot unit is shifted into the clamping position, whereas inward movement of the actuating rod leads to retraction into the release position. In order to preset the clamping position a stationary or adjustable terminal abutment (which has an abutment face on the bearing head) is provided, against which the actuating rod strikes on reaching clamping position at the end thereof. This impact leads to a high load on the actuating rod and on the piston, which is normally connected with the rod, of the actuating means.

SUMMARY OF THE INVENTION

One object of the invention is to provide a toggle lever clamping device of the type initially mentioned in the case of which loads prone to produce wear are reduced.

In order to achieve this aim there is the provision that the abutment face is in the path of motion of the pivot unit and cooperates with the pivot unit for presetting the clamping position.

It is in this manner that the clamping position is predetermined by the cooperation between an abutment face on the bearing head and the pivot unit comprising clamping arm. This is responsible for a reduction of impacts otherwise occurring during operation on reaching the clamping position and correspondingly of the load on the actuating means and the components thereof. Owing to the leverage normally present the impact velocity is substantially reduced to below that in the prior art.

Further advantageous developments of the invention are defined in the dependent claims.

It is convenient for the pivot unit to comprise a pivot lever connected in such a manner as to prevent relative rotation with the clamping arm, on which lever the second bearing point is located and which cooperates with the abutment face on the bearing head. This pivot lever may be a component separate from the clamping arm, and be mounted in such a manner as to prevent relative rotation on a bearing pin (which is rotatably mounted on the bearing head) defining the pivot axis, on which pin the clamping arm is mounted in such a manner as to prevent relative rotation. Such an arrangement proves advantageous as regards accommodating the pivot lever in the interior of the bearing head and in the immediate neighborhood of the actuating rod. The clamping arm itself can be located clear of the bearing head so that the bearing head may be designed with compact dimensions.

It is preferred for the abutment face to be provided on the inner side of the bearing head's wall which is located radially short or in front of the pivot axis and extends in parallelism to the pivot axis of the pivot unit. In the case of a pivot unit provided with a pivot lever the said wall preferably extends in front of the pivot lever and aligned at a right angle to the pivot plane.

In the case of a particularly preferred design there is a provision such that the pivot unit comes into engagement with the abutment face just prior to reaching the dead center position of the toggle lever arrangement. The dead center position is defined by a state in which the angle between on the one hand the imaginary connecting line between the two bearing points and on the other hand the longitudinal axis of the actuating rod is a right angle. As the actuating rod moves out of the release setting of the clamping arm the enclosed angle, which is initially still obtuse decreases gradually until the dead center position is reached, the actuating rod conveniently moving on further to a small extent until the enclosed angle is somewhat less than 90 degrees. This terminal position of the actuating rod may for instance be preset by arranging a piston (of the actuating means) connected with the actuating rod comes into engagement with a cover of the actuating means. Since however the contrivance, which was moved, is braked, the load on the piston is in this case small.

In order to ensure that the toggle lever arrangement can move past the dead center setting without difficulty, the joint connection at one of the two bearing points at least is preferably so designed that there is a possibility of a small relative movement in the radial direction in relation to the pivot axes between the components which are articulated together. This is something which may be achieved by a suitable design of the bearings and/or by the provision of suitable elastic means.

In order to minimize the load on the actuating means even on displacement of the clamping arm into the release position, there is preferably a second abutment face provided clear of the actuating means on the actuating rod, such second abutment face being able to run up against a counter face on the bearing head.

The invention will now be described in the following with reference to the accompanying drawings in detail.

DETAILED DESCRIPTION OF THE PREFERRED EMBODIMENTS

Figure 1:
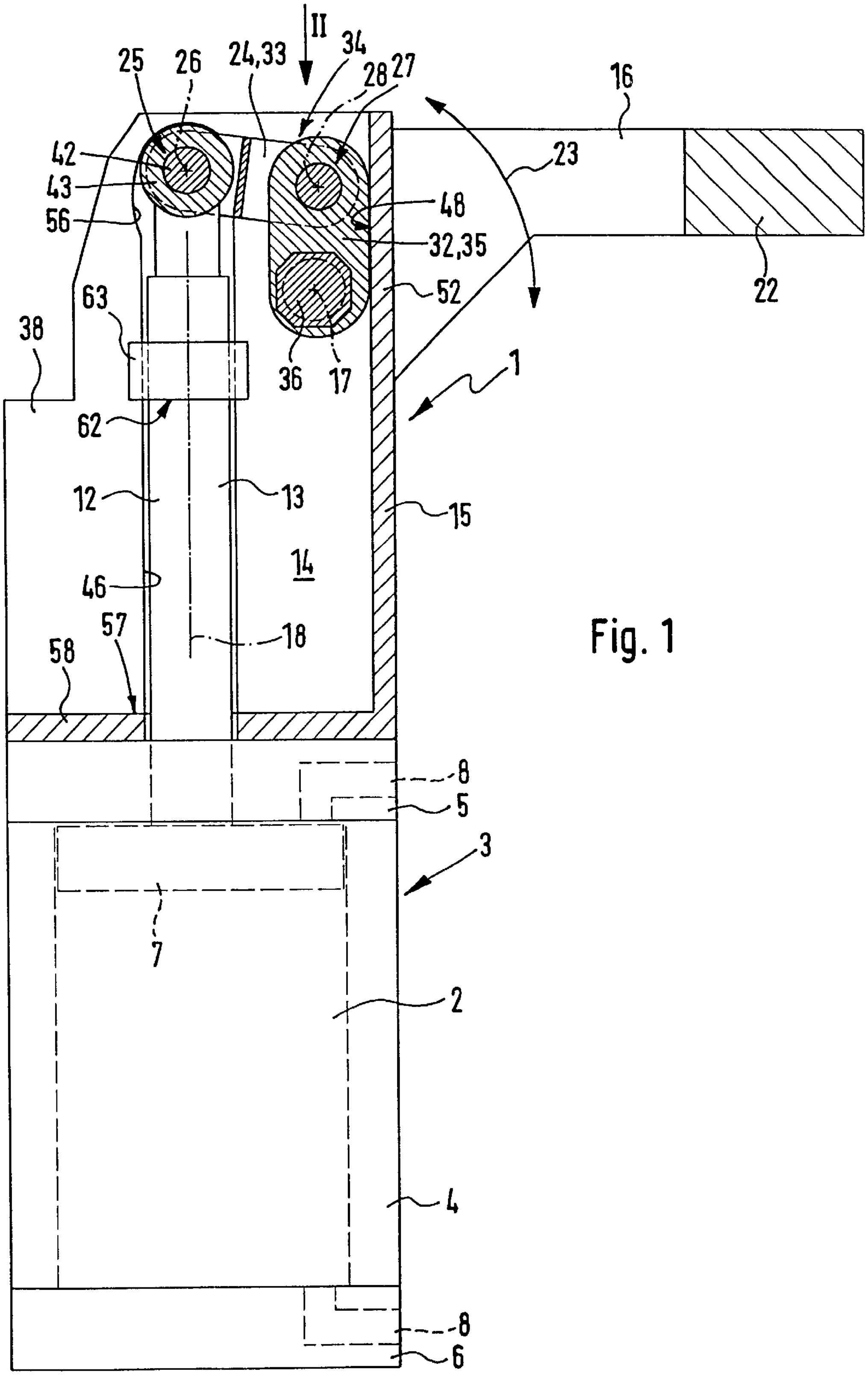
FIG. 1 shows a preferred embodiment of the toggle lever clamping device of the invention with the clamping arm located in the clamping setting and partially in a longitudinal section taken on the line I—I of FIG. 2.

The toggle lever clamping device 1 of the embodiment comprises an actuating means 2, which is constituted by a fluid driven power cylinder and more particularly by a pneumatic cylinder. It has a elongated housing 3 with a tubular middle part 4 and end plates 5 and 6 arranged terminally thereon. The interior space of the housing 3 is divided up by a piston 7, which runs axially therein, into two working spaces, which via fluid ducts 8 internal to the housing may be alternately subjected to a fluid pressure medium and vented in order to cause an axial linear movement of the piston 7.

A piston rod, referred to in the following as an actuating rod 12, is attached to the piston 7 and extends through the front end plate 5 in a sealing manner. It outer terminal section 13 located outside the housing 3 thus plunges into the interior space 14 of a bearing head 15 mounted on the front end side of the housing 3. The depth of plunging is dependent on the instantaneous axial position of the actuating rod 12, which may be predetermined by the above mentioned action of fluid on the piston 7.

A pivot unit generally referenced 16 is pivotally mounted on the bearing head 15. The pivot axis indicated by reference numeral 17 is to the side of the path of axial movement of the actuating rod 12 extends perpendicularly to the longitudinal axis 18 thereof.

An important component of the pivot unit 16 is a clamping arm 22. It projects away from the bearing head 15 and may for example be employed to clamp one or more workpieces in manufacturing processes. The pivotal range of the pivot unit 16 renders it possible to pivot the clamping arm 22 as indicated by the double arrow 23 between the clamping position apparent in FIG. 1 and a release position, not illustrated, in relation to the bearing head 15. The center of the pivot movement is the pivot axis 17. The pivot movement is caused by the actuating means 2 and in this respect particularly by the actuating rod 12 thereof, which in the interior space 14 of the bearing head 15 is connected with the pivot unit 16 in a driving manner. For this purpose the outer end section 13 of the actuating rod 12 is pivotally joined via a single or multi-part intermediate member 24 with the pivot unit 16.

As regards particulars the intermediate member 24 is rotatably mounted at a first bearing point 25 on the actuating rod 12. The associated first axis of rotation is referenced 26 in the drawing. Its opposite terminal section is connected with the preferably lug-like intermediate member 24 for making a pivotal connection via a second bearing point 27 with the pivot unit 16, the respective second axis of rotation being referenced 28.

The two axes 26 and 28 of rotation extend in parallelism to the pivot axis 17, the second axis 28 of rotation extending at a distance from the pivot axis 17. The section, extending between the second axis 28 of rotation and the pivot axis 17 of the pivot unit thus represents a first lever 32, which together with the intermediate member 24 representing a second lever 33 forms a toggle lever arrangement 34.

Figure 2:
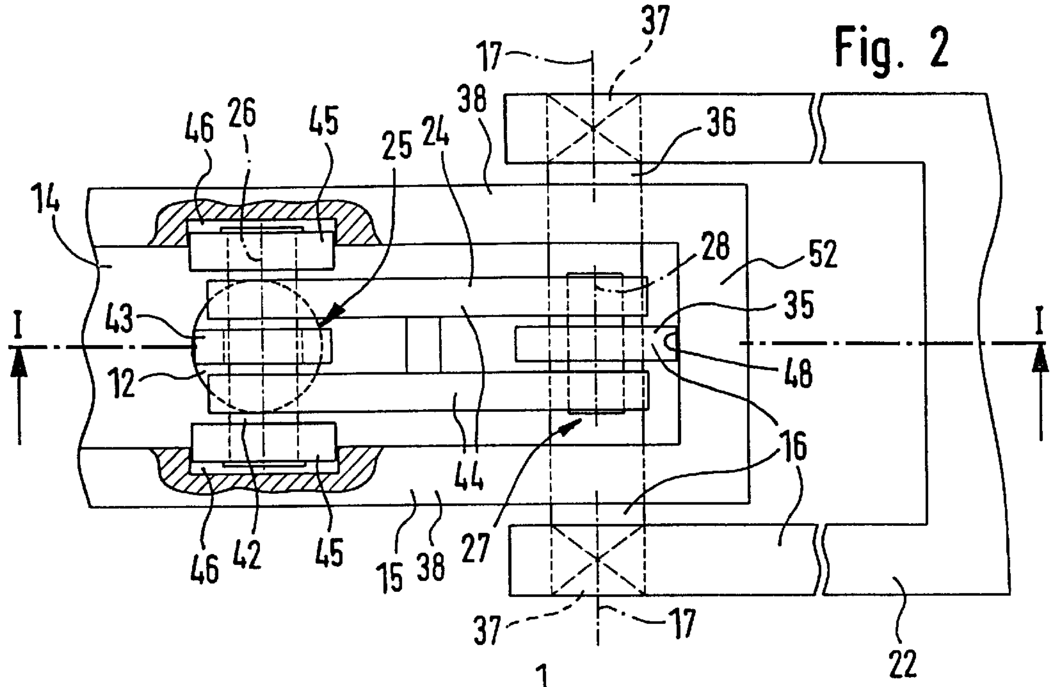
FIG. 2 shows the toggle lever clamping device in an axial plan view of the bearing head looking in the direction of the arrow II in FIG. 1.

The first lever 32 could be an integral component of the pivot unit 16. However to have a compact structure and simple assembly it is in the working example in the form of a pivot lever 35, which is separate from the clamping arm 22, with which it is however connected in such a manner as to prevent relative rotation. Details of the preferred design will be more especially seen from FIG. 2.

In accordance with this figure a bearing pin 36, which defines the pivot axis 17, is rotatably mounted on the bearing head 15. It extends through the bearing head 15, from which it projects on opposite sides, the clamping arm 22, arranged clear of the bearing head 15, being secured at the two outer end sections 37 of the bearing pin 36 in such a manner as to prevent relative rotation. Here it is possible for the bearing head 15 may have two plate-like side walls 38 which at least in part are spaced apart from one another and more particularly extend in parallelism to each other, leaving an interior space 14 between them, the bearing pin 36 extending through them leaving a rotary bearing means (not illustrated) in between. The clamping arm 22 may in the form of a fork at its end nearer the bearing head 15 and partly straddle the bearing head 15 with its arms attached to the bearing pin.

The pivot lever 35 is mounted in a manner preventing relative rotation on the middle section of the bearing pin 36, which extends through the interior space 14. Starting at this bearing pin 36 it extends to the front side, opposite to the actuating means 2, of the bearing head 15, where the second bearing point 27 is located, on which the intermediate member 24 is joined in a pivotal manner, more particularly also by means of a joint pin connection.

The first bearing point 25 is conveniently also designed using a second bearing pin 42. This pin extends through a bearing opening 43 provided at the terminal end of the actuating rod 12 and furthermore the associated terminal section of the intermediate member 24, which in the embodiment possesses two lug elements 44, which are more especially rigidly connected together, and which flank both the bearing opening 43 and also the pivot lever 35 on opposite sides.

The second bearing pin 42 is extended past the intermediate member 24 axially on either side and at its terminal sections bears more particularly roller-like guide elements 45 which are more particularly rotatably supported. Such elements 45 respectively run in a guide groove 46, such grooves being provided on the inner face of the respectively adjacent side wall 38 of the bearing head 15. The guide grooves 46 run in parallelism to the longitudinal axis 18 and accordingly in the direction of motion of the actuating rod 12.

In order to move into the release setting of the clamping arm 22, the actuating means 2 is so operated that the actuating rod 12 assumes a position as far as possible in the housing 3. The piston 7 is then moved as close as possible to the rear end plate 6. Simultaneously the first bearing point 25 is adjacent to the front end plate 5.

Figure 3:
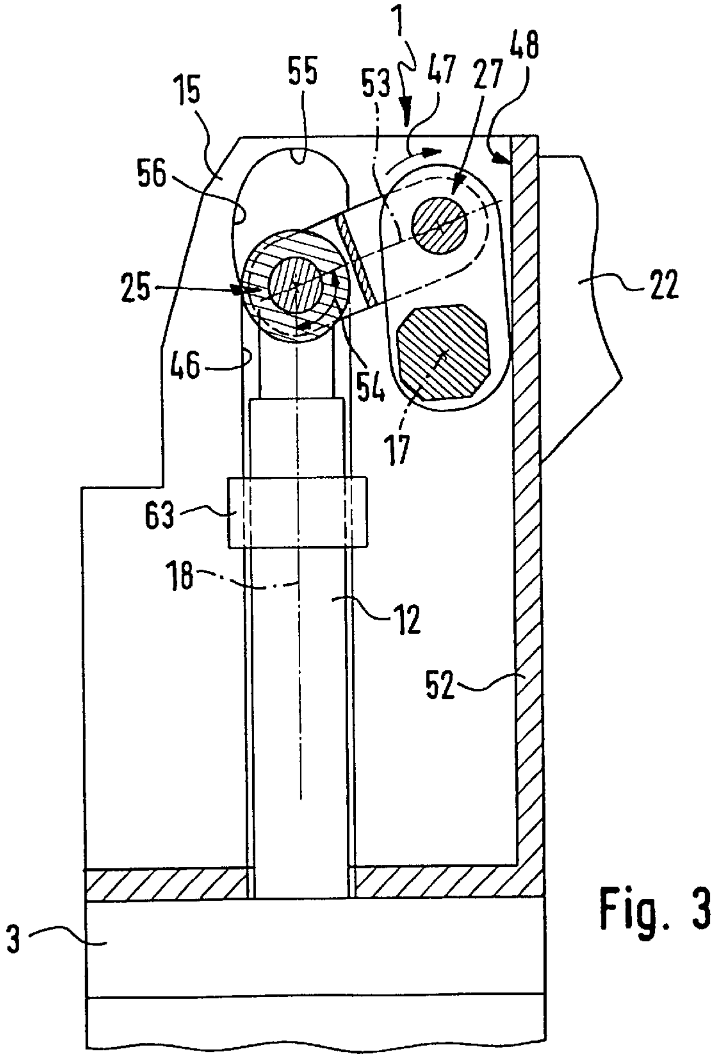
FIG. 3 illustrates the toggle lever device of FIGS. 1 and 2 in a partial view limited to the bearing head in an intermediate setting of the clamping arm on transition between the clamping setting and the release setting.

In order to pivot the clamping arm 22 as a preliminary into the position indicated in FIG. 1, the actuating rod 12 is caused to leave the housing 3 in an outward movement. Thus the first bearing point 25 moves axially away from the front end of the housing 3, the pivot lever 35 then executing an outwardly and forwardly directed pivot movement as indicated by the arrow 47 about the pivot axis 17, this causing motion in the second pivot bearing point 27 to perform a movement along an arcuate path. FIG. 3 indicates a frozen view of the toggle lever clamping device 1 while the piston rod is moving outward, the clamping arm assuming an intermediate position between the release position and the clamping position.

The clamping arm 22 reaches its clamping position when the pivot unit 16 arrives at an abutment face 48 in its path of pivoting provided on the bearing head 15. Preferably it is the pivot lever 35, which, acting for the rest of the pivot unit 16, cooperates with the abutment face 48. For this purpose the abutment face 48 is provided on the inner side of a further side wall 52, extending between the two side walls 38, of the bearing head 15, which is placed in front of the pivot axis 17 radially and extends along a line adjacent to the pivot lever 35. It preferably constitutes a further limiting element of the bearing head 15 for the inner space 14 thereof. Preferably furthermore it is located on the side, facing the clamping arm 22, of the bearing head 15. It may form a component of the two other side walls 38.

As the clamping position is approached the longitudinal axis 18 of the actuating rod 12 will be at a first angle 54 to the imaginary line 53, extending between the two bearing points 25 and 27 on the side facing the pivot lever 35, such angle being an obtuse angle. On further outward displacement of the longitudinal axis 18 the first angle 54 will be incrementally reduced until the pivot lever 35 abuts the abutment face 48 and cannot pivot any farther. This setting is preferably reached even prior to reaching the dead center position of the toggle lever arrangement 32 and 33, that is to say in the working example even before the first angle 54 becomes a right angle. It is convenient for the arrangement to be so designed that contact between the pivot unit 16 or its pivot lever 35 and the abutment face 48 takes place approximately 3 to 5 degrees before reaching the dead center position, it having turned out to be an advantage if the angle of pivoting of the intermediate member 24 before reaching the dead center position amounts to approximately 4 degrees.

On the first contact of the pivot lever 35 with the abutment face 48 the principal load is taken up. At this point in time the piston 7 will not so far have yet reached its front end position. The outward motion of the actuating rod 12 will hence be continued a little, the toggle lever arrangement 34 moving past the dead center position so that the first angle becomes an acute angle of somewhat less than 90 degrees. This axial terminal position of the first bearing point 25 or, respectively, of the actuating rod 12 is for example set by the piston 7 coming into abutment with the inner face of the front end plate 5 or by the actuating rod 12 engaging a stroke limiting face 55 provided in its path of displacement, preferably on the bearing head 15. This setting is illustrated in FIG. 1.

Accordingly in addition to the abutment face 48 cooperating with the pivot unit 16 there are stroke limiting means cooperating with the linearly moving components 7 and 12 of the actuating means 2, such stroke limiting means only taking effect when the pivot unit 16 has already come into engagement with the abutment face 48. This two stage abutment function results in an extremely advantageous distribution of forces, which leads to reduced loading of the components of the toggle lever clamping device 1 and more particularly of its actuating means 2.

In order to ensure that on moving past the dead center no disadvantageous strains in the overall system occur, in the working embodiment the joint connection embodied by the first bearing point 25 is so designed that a possibility of radial motion between the intermediate member 24 and the actuating rod 12 is provided for. This is made possible for example although the second bearing pin 24 carrying the guide elements 45 is rotatably supported in the intermediate member 24 free of radial play, it has certain degree of freedom of movement athwart the direction of motion of the actuating rod 12. This may for instance be rendered possible by using a suitably designed ball bearing. The guide paths, defined by guide grooves 46, for the guide elements 45 are provided with a lateral bay 56 at the dead center position so that all in all the dead center position may be exceeded without any risk of jamming of the intermediate member 24 between the two bearing points 25 and 27.

It is convenient for not only the clamping position but also the release position of the clamping arm 22 to be set by an abutment face provided on the bearing head 15, which in the following will be referred to as the second abutment face 57. It is located on the side, which faces away from the actuating means 5, of the floor 58 of the bearing head 15, which is mounted on the actuating means 2. It is conveniently arranged directly adjacent to the actuating rod 12 extending through the floor 58, said rod 12 being possibly surrounded by the second abutment face 57 concentrically.

A counter abutment face 62 is provided for the second abutment face 57, said face 62 being provided on the outer end section 13 of the actuating rod 12 and best being provided on a radial spur on the actuating rod 12, which spur may be constituted by an abutment element 63 screwed on the actuating rod 12. The position of the element 63 on the actuating rod 12 is preferably so selected that the counter abutment face 62 on the second abutment face 57 comes into engagement before the piston 7 strikes the rear end plate 6.

What is claimed is:

1. A toggle lever clamping device comprising:

a bearing head (15) terminally arranged on an actuator (2);

a pivot unit (16) having a clamping arm (22), the pivot unit is pivotally mounted for movement (17) about a pivot axis between a release position and a clamping position;

an actuating rod (12), plunging into the bearing head (15) of the actuator (2);

an intermediate member (24) articulated at a first bearing point (25) with the actuating rod (12) and at a second bearing point (27) with the pivot unit, the second bearing point spaced a distance from the pivot axis (17) of the pivot unit;

an abutment face (48) being provided on the bearing head (15) wherein the abutment face (48) is positioned in the path of motion of the pivot unit (16) and cooperates with the pivot unit (16) for presetting the clamping position; and wherein the actuator is extendable to a first position in which the clamping arm is moved to the clamping position, and the actuator is further extendable to a second position beyond the first position such that the clamping arm is securely retained in the clamping position.

2. The clamping device as claimed in claim 1, characterized in that the pivot unit (16) comprises a pivot lever (35) connected with the clamping arm (22) in such a manner as to prevent relative rotation, said second bearing point (27) being located on such pivot lever which cooperates with the abutment face (48) on the bearing head.

3. The clamping device as claimed in claim 2, characterized in that the pivot lever (35) is mounted in such a manner as to prevent relative rotation on a bearing pin (36), which is rotatably mounted on the bearing head (15) and defines the pivot axis (17), said clamping arm (22) also being locked on said bearing pin in such a manner as to prevent relative rotation.

4. The clamping device as claimed in claim 2, characterized in that the pivot lever (35) is arranged in the interior of the bearing head (15).

5. The clamping device as claimed in claim 3, characterized in that the clamping arm (22) is positioned outside the bearing head (15) on the bearing pin (36).

6. The clamping device as claimed in claim 1, characterized in that the abutment face (48) is provided on the inner side of a wall (52) of the bearing head (15), said wall extending in parallelism to the pivot axis (17) of the pivot unit (16) and being placed radially in front of the pivot axis (17).

7. The clamping device as claimed in claim 1, characterized in that the abutment face (48) is so arranged that the pivot unit (16) comes into engagement with the abutment face (48) just prior to reaching a dead center position of the toggle lever arrangement.

8. The clamping device as claimed in 7, characterized in that the contact between the pivot unit (16) and the abutment face (48) takes place approximately 3 to 5 degrees prior to reaching the dead center position.

9. The clamping device as claimed in 7, characterized in that the joint connection at one of the two bearing points (25 and 27) at least is so designed that at least on passing through the dead center position there is a possibility of radial relative movement between the parts which are articulated with each other.

10. The clamping device as claimed in claim 7, characterized in that the stroke limiting means (5 and 55) only take effect after moving past the dead center position of the toggle lever arrangement.

11. The clamping device as claimed in claim 1, characterized by stroke limiting means (5 and 55) cooperating with the actuating rod, the stroke limiting means taking effect after the pivot unit (16) has come into engagement with the abutment face (48).

12. The clamping device as claimed in claim 1, characterized in that for presetting the release position a second abutment face (57) is provided clear of the actuating means (2) on the bearing head (15), against which a counter abutment face (62) provided on the actuating rod (12) may abut on inward motion of the actuating rod.

13. A toggle lever clamping device comprising:

a bearing head terminally arranged on an actuator;

a pivot unit having a clamping arm, the pivot unit is pivotally mounted for movement about a pivot axis between a release position and a clamping position;

an actuating rod plunging into the bearing head of the actuator;

an intermediate member articulated at a first bearing point with the actuating rod and at a second bearing point with the pivot unit, the second bearing point spaced a distance from the pivot axis of the pivot unit; and an abutment face being provided on the bearing head wherein the abutment face is positioned in the path of motion of the pivot unit and cooperates with the pivot unit for presetting the clamping position; and a stroke limiting means cooperating with the actuating rod, the stroke limiting means taking effect after the pivot unit has come into engagement with the abutment face.

14. A toggle lever clamping device comprising:

a bearing head terminally arranged on an actuator;

a pivot unit having a clamping arm, the pivot unit is pivotally mounted for movement about a pivot axis between a release position and a clamping position;

an actuating rod plunging into the bearing head of the actuator;

an intermediate member articulated at a first bearing point with the actuating rod and at a second bearing point with the pivot unit, the second bearing point spaced a distance from the pivot axis of the pivot unit;

an abutment face being provided on the bearing head wherein the abutment face is positioned in the path of motion of the pivot unit and cooperates with the pivot unit for presetting the clamping position; and a second abutment face for presetting the release position being provided on the bearing head clear of the actuator against which a counter abutment face provided on the actuating rod may abut on inward motion of the actuating rod.

15. A toggle lever clamping device comprising:

a bearing head terminally arranged on an actuator;

a pivot unit having a clamping arm, the pivot unit being pivotally mounted about a pivot axis and movable between a release position and a clamping position;

an actuating rod extending into the bearing head;

an intermediate member articulated at a first bearing point with the actuating rod and at a second bearing point with the pivot unit, the second bearing point be spaced a distance from the pivot axis;

an abutment face being provided on the bearing head wherein the abutment face is positioned in the path of motion of the pivot unit and cooperates with the pivot unit for presetting the clamping position; and wherein the abutment face is so arranged that the pivot unit comes into engagement with the abutment face just prior to reaching a dead center position of the toggle lever arrangement, the dead center position occurring when a reference angle formed by a longitudinal axis of the actuating rod and a line extending between the first and the second bearing points is approximately 90 degrees, and wherein the actuator is extendable beyond the dead center position such that the reference angle is an acute angle.

* * * * *